United States Patent
Hansson (10) Patent No.: US 7,114,892 B2
(45) Date of Patent: Oct. 3, 2006

(54) ROTATABLE TOOL FOR CHIP REMOVING MACHINING

(75) Inventor: Lars-Ola Hansson, Sandviken (SE)

(73) Assignee: Sandvik Intellectual Property, Sandviken (SE)

(*) Notice: Subject to any disclaimer, the term of this patent is extended or adjusted under 35 U.S.C. 154(b) by 120 days.

(21) Appl. No.: 11/034,723

(22) Filed: Jan. 14, 2005

(65) Prior Publication Data

US 2005/0186042 A1     Aug. 25, 2005

(30) Foreign Application Priority Data

Jan. 14, 2004   (SE) ................................ 0400056

(51) Int. Cl.
*B23B 51/02*   (2006.01)

(52) U.S. Cl. ............ 408/226; 408/230; 408/232; 408/713

(58) Field of Classification Search ............ 408/144, 408/226, 227, 230, 231, 232, 233, 713
See application file for complete search history.

(56) References Cited

U.S. PATENT DOCUMENTS

| | | | |
|---|---|---|---|
| 5,957,631 A * | 9/1999 | Hecht | 408/144 |
| 6,783,307 B1 * | 8/2004 | Lindblom | 408/226 |
| 6,783,308 B1 * | 8/2004 | Lindblom | 408/230 |

2003/0103824 A1   6/2003   Hansson et al.

FOREIGN PATENT DOCUMENTS

| | | | |
|---|---|---|---|
| DE | 94340 | * | 9/1896 |
| DE | 367010 | * | 1/1923 |
| DE | 32 30 688 | | 2/1984 |
| DE | 20204848 U1 | * | 7/2002 |
| JP | 2002113606 A | * | 4/2002 |
| JP | 2003291019 A | * | 10/2003 |
| WO | WO 2003031104 A1 | * | 4/2003 |

* cited by examiner

*Primary Examiner*—Daniel W. Howell
(74) *Attorney, Agent, or Firm*—Drinker Biddle & Reath LLP (57) ABSTRACT

A rotatable tool for chip removing machining includes a drill shank, and an exchangeable loose top mounted at an axially front end of the shank. Between these there is a coupling, which includes a male part on the loose top, and a groove in the basic body. By means of a slot, two deflectable legs are defined by the shank, which legs form a jaw for receiving and clamping the male part. The maximal width of the jaw upon deflection of the legs away from one another is larger than the maximal breadth of a wedge portion included in the male part. Furthermore, the angles of inclination of flank surfaces on the male part and side surfaces in the groove, are equally large in order to guarantee surface contact between said surfaces, when the legs are resiliently tightened against the male part. The wedge portion is of dovetail shape, wherein the loose top is drawn axially against the shank as it is being radially clamped by the legs.

9 Claims, 5 Drawing Sheets

ROTATABLE TOOL FOR CHIP REMOVING MACHINING

The present application claims priority under 35 U.S.C. § 119 to Patent Application Serial No. 0400056-8 filed in Sweden on Jan. 14, 2004.

TECHNICAL FIELD OF THE INVENTION

This invention relates to a rotatable tool intended for chip removing or chip forming machining, of the type that comprises a basic body rotatable around a geometrical center axis, as well as a replaceable cutting part or insert body, which is connectable to the basic body via a male/female coupling.

Typically, such a coupling includes on the one hand a female-like groove formed in a front end of the basic body, and on the other hand a male part insertable in the groove, the male part protruding rearward from a main part of the cutting part. The male part comprises a front base portion positioned adjacent to the main part, which is delimited by a pair of opposite, first flank surfaces, as well as a rear wedge portion, which is more slender than the base portion and is delimited by a pair of opposite, second flank surfaces. A forwardly open slot is formed in the front part of the basic body, which slot separates two elastically deflectable legs with the purpose of clamping the male part in the groove. The groove comprises two, spaces of different respective widths, namely a front space mouthing in a free end surface of the basic body (which space is delimited by a pair of first, opposite side surfaces), and a rear bottom space, which is delimited by a pair of second, opposite side surfaces. At least one of said two second flank surfaces is inclined at an angle in relation to the center axis in the direction outward/rearward from the cutting part, at the same time as a co-operating side surface in the groove is inclined in relation to the center axis at an angle in the direction inward/forward from the basic body with the purpose of providing a wedge action. The wedge action, when tightening the legs against the male part, guarantees an axial insertion of the male part into the groove.

The bottom space in the groove forms a jaw having a variable width, namely in a radial plane oriented perpendicular to the center axis, which radial plane intersects a front edge line along an inclined side surface. The wedge portion of the male part has a maximum breadth in a radial plane, which intersects a rear edge line along an inclined flank surface.

Such cutting tools that make use of a basic body, as well as a separate, replaceable cutting part, may in practice be of widely varying shapes and consist of, for instance, drilling tools, milling tools, such as end mills or slitting cutters, thread cutters, etc. The basic body usually consists of an elongate shank having a cylindrical basic shape. In modern machine tools, the basic bodies are so sophisticated and expensive that for economical reasons they should not be integrated with the cutting part, which constitutes the wear part of the tool and has a limited service life. In other words, it is profitable to make the actual cutting part in the form of a separate, detachable unit, which by those skilled in the art usually is denominated "loose top", and which may be exchanged after wear, while the expensive basic body may be used during longer period of time (usually 10 to 20 cutting part exchanges). In practice, the loose top is manufactured entirely or partly from a hard, wear-resistant material, such as cemented carbide or the like, while the basic body is made from a material having greater elasticity, e.g. steel. It should also he pointed out chat tools of the kind in question are primarily—though not necessarily—intended for the machining of metal workpieces.

A tool of the type initially mentioned is previously known from EP 13 10 313-A1 (corresponding to U.S. Published Application No. 2003/0103824). Characteristic of that tool is that the male part of the loose top is formed as a slide, and the female part of the loose top is in the form of a laterally open groove into which the male part may be inserted from the side. More precisely, the wedge portion of the male part has a maximum breadth that is larger than the maximal width of the jaw, which comprises the cross-section-wise wedge-shaped bottom space of the groove. In such a way, an axial insertion of the male part of the loose top in the groove is made impossible even when the deflectable legs of the basic body are maximally distanced from each other.

Underneath the male part, there is a rotationally symmetrically shaped-protrusion, which by being brought to engagement with a central, likewise rotationally symmetrically shaped seating in the bottom surface of the groove, has the purpose of centering the loose top in relation to the basic body. When the male part is inserted into the groove from either groove side, the centering protrusion is caused to slide along the bottom surface of the groove up to the point where the protrusion reaches the seating, whereby the protrusion should automatically fall into the seating.

During such movement of the loose top to and from the centered position, only a limited space is available between the bottom side of the male part and the bottom surface of the groove. For this reason, the centering protrusion can only be given a very limited height. Furthermore, the protrusion and the seating have to have such a shape that the seating, which should be able to withstand repeated exchanges of loose tops, is not subjected to deformation damage during the exchanges.

Furthermore, characteristic of the known tool is that the two side surfaces that define the rear, cross-section-wise wedge-shaped bottom space of the groove, are mutually inclined at an angle different from the angle formed by the external flank surfaces on the wedge portion of the male part. More precisely, the first-mentioned angle is smaller than the last-mentioned one, whereby a line contact arises between the cooperate surfaces as deep inside the groove as possible. In other words, a clearance is obtained between said flank surfaces in the direction outward or forward from the line contact places.

In practice, this fact has turned out to entail disadvantages and difficulties relating to the possibilities of realizing the tool in a practically satisfying way. Thus, the limited line contact between the bottom space of the groove and the wedge portion of the male part has meant that the capacity of the tool to transmit torque between the basic body and the loose top has become mediocre. Furthermore, it happens that the loose tops made from hard material tend to crack or become sheared apart by virtue of extreme stress concentrations arising adjacent to the line contact places. Furthermore, the limited height of the centering protrusion has meant that the centering function of the protrusion has become unreliable. Above all, users of the tool have experienced uncertainty as regards the question whether the protrusion has come into engagement with the seating before the deflectable legs are brought to clamp the loose top. Another, psychological disadvantage is that users have found it unnatural to insert the loose top from the side of the groove of the basic body.

From DE 32 30 688 A1 a tool made in the form of a milling tool having an exchangeable loose top is previously known. In this case, the male member of the loose top consists of a genuinely conical pin, which is movable into and out of a likewise conically shaped seating, which opens in the front end of the basic body. The fact that the pin as well as the seating is conical means that the coupling therebetween has to be formed with a particular, production-wise complicating rotary locking. This rotary locking in turn makes the possibility of distinctly centering the loose top in relation to the basic body more difficult.

OBJECTS AND FEATURES OF THE INVENTION

The present invention aims at obviating the above-mentioned drawbacks of the tool according to EP 1 310 313-A1, and at providing an improved tool. Thus, a primary object of the invention is to provide a tool, the loose top of which can be assembled and disassembled, respectively, in a natural way for the user, at the same time as the coupling between the loose top and the basic body should enable transmitting of great torque.

Another object of the invention is to provide a tool, the centering means of which guarantee a distinct and accurate centering of the loose top in relation to the basic body.

Yet a further object of the invention is to provide a tool in which the risk of demolition of the loose tops during operation is reduced to a minimum.

According to the invention, at least the primary object is attained by a rotatable tool for chip removing machining. The tool comprises a basic body which is rotatable about a geometrical center axis, and a replaceable cutting part which is rigidly connectable to a front end of the basic body by a male/female coupling. The coupling comprises a groove formed in a front end of the basic body, and a male part insertable into the groove and protruding rearwardly from the cutting part. The male part comprises a front base portion which is delimited by a pair of opposite, first flank surfaces, as well as a rear wedge portion which is narrower than the base portion and delimited by a pair of opposite, second flank surfaces. A forwardly open slot is formed in the front part of the basic body. The slot communicates with the groove and separates two elastically deflectable legs of the basic body which clamp the male part in the groove. The groove comprises two axially separated front and rear spaces. The front space mouths at a free front end surface of the basic body and is delimited by a pair of first, opposite side surfaces. The rear space is delimited by a second pair of opposite side surfaces. At least one of the two second flank surfaces of the male part is inclined at a first acute angle in relation to the center axis in a radially outward and axially rearward direction. One of the second side surfaces is disposed at the rear space of the groove and is inclined in relation to the center axis at a second acute angle in a direction radially inward and axially forward. The rear space of the groove forms a jaw having a variable minimum width in a radial plane oriented perpendicular to the center axis. The wedge portion of the male part has a maximum width in a radial plane. The legs are elastically deflectable away from one another, wherein the minimum width of the groove upon deflection of the legs away from one another is larger than the maximum width of the wedge portion of the male part. The first and second acute angles are equally large to create surface contact between the flank surfaces and the side surfaces when the legs resiliently spring back against the male part from their deflected state.

BRIEF DESCRIPTION OF THE DRAWINGS

The objects and advantages of the invention will become apparent from the following detailed description of a preferred embodiment thereof in connection with the accompanying drawing in which like numerals designate like elements, and in which.

DETAILED DESCRIPTION OF PREFERRED EMBODIMENTS

The cutting tool shown in FIGS. 1–8 is in the form of a drill, which in the usual way includes a basic body, generally designated 1, as well as a replaceable cutting part or "loose top" 2. The basic body 1 comprises in this case an elongate shank having a cylindrical basic shape, which in the drawings is shown in a fragmentary or cut-off state. The basic body is in a suitable way mountable in a machine, e.g., a multi-operation machine, and has two helicoidal, cross-section-wise concavely curved limiting surfaces 3, which form chip channels. In a front or outer end of the basic body 1, a groove 4 is formed, in which a slot 5 mouths, which separates two elastically deflectable legs 6. On both sides of the groove 4, there are thrust load transmitting surfaces 7, in which channels 8 mouth for the transfer of cooling liquid to the corresponding channels 8' in the loose top 2.

The loose top 2 has a rotationally symmetrical basic shape, in that it has a circular outer contour shape in connection with a substantially cylindrical or rearward slightly conical envelope surface 9. The front surface 10 on the loose top is conical, having the tip of the cone directed forward. Generally, the loose top has a diameter that is somewhat larger than the diameter of the basic body 2. In the envelope surface 9, two concavely curved limiting surfaces 3' are formed, which connect to the surfaces 3 and define chip channels in the loose top. In the front part of the loose top, cutting edges 11 are formed. At the rear or inner end thereof, the loose top 2 has a male part in its entirety designated 12 for engagement with the groove 4. On both sides of the male part 12, there are planar, thrust load-receiving, axially facing surfaces 13 for cooperation with the surfaces 7 on the basic body to transmit axial thrust.

Figures 1, 2, 3:
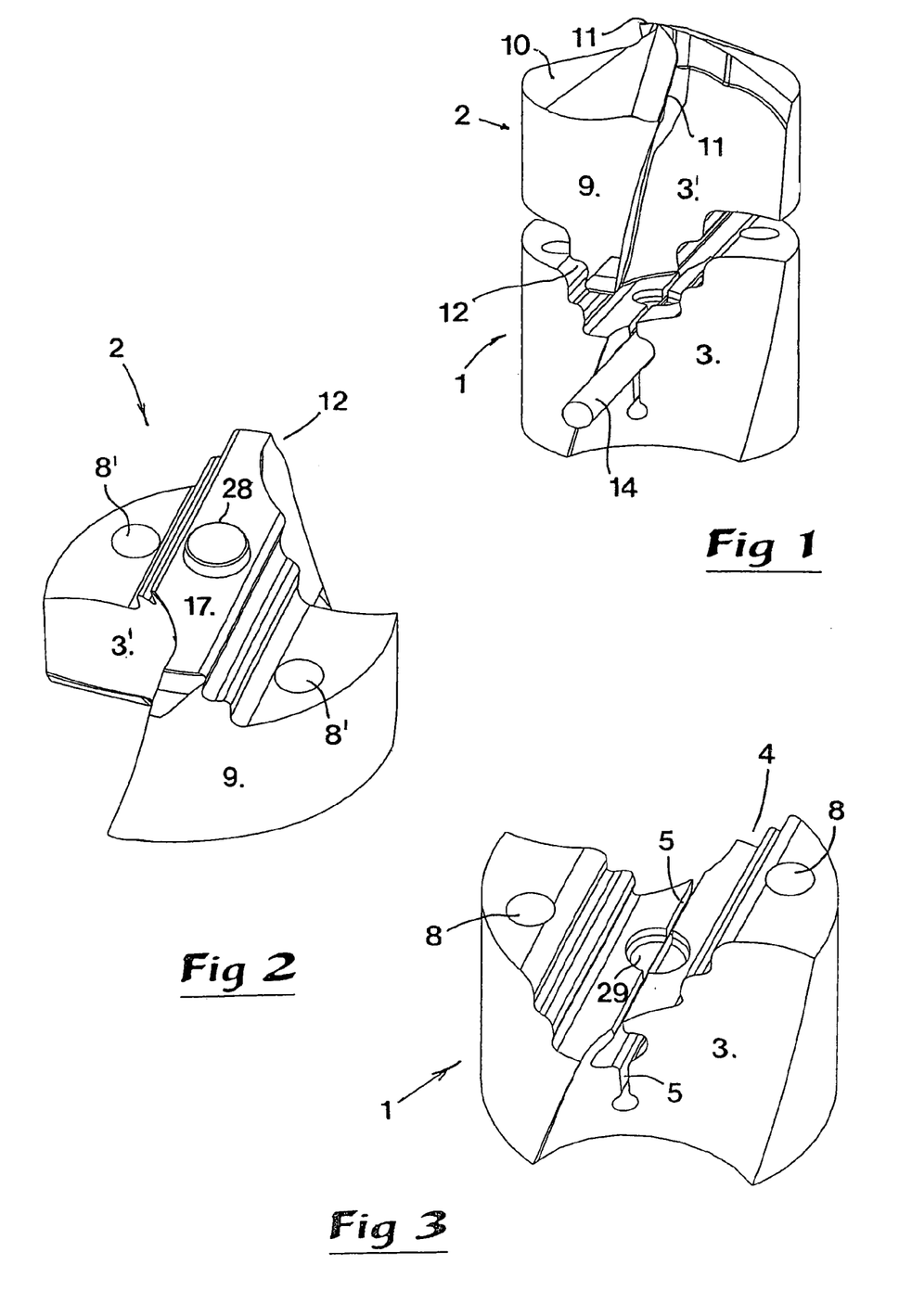
FIG. 1 is a perspective exploded view showing a loose top, as well as a partially illustrated basic body in the form of a drill shank.
FIG. 2 is an enlarged perspective view of the loose top seen from behind.
FIG. 3 is a partial perspective view showing a front end of the basic body in a freely exposed state.
Figure 4:
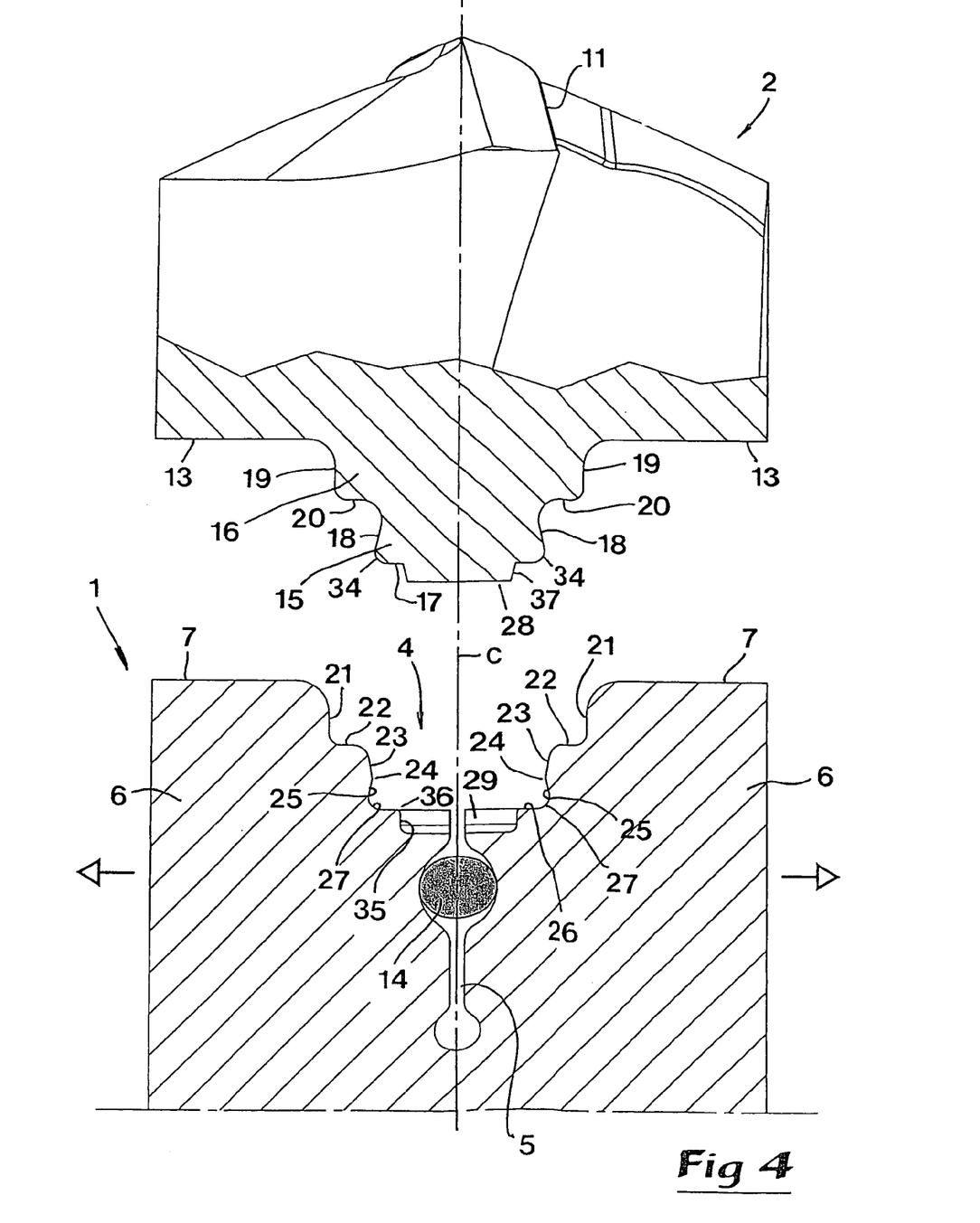
FIG. 4 is an exploded view showing the basic body in longitudinal section, as well as the loose top in a partially cut side view, two legs included in the basic body being shown in a deflected state for receipt of the loose top.

In FIG. 4, the letter C designates a geometrical center axis, around which the composed tool is rotatable. Said center axis should be common for the basic body 1 and the loose top 2, if the top 2 is exactly centered in relation to the basic body. The axially facing end surfaces 7 on the basic body 1 as well as the end surfaces 13 on the loose top 2 extend in planes, which are perpendicular to the center axis C.

The loose top 2 is made entirely or partly from cemented carbide or other wear-resistant material, while the basic body 1 is made from a material having a considerably greater elasticity, e.g. steel. Steel is preferable for the basic body as a consequence of the inherent elasticity or flexibility thereof, which makes it possible to resiliently deflect the legs 6 that are spaced-apart by the slot 5. Such deflection of the legs is achieved in the example by a clamping device 14 in the form of a key having an oval cross-section shape.

Figure 5:
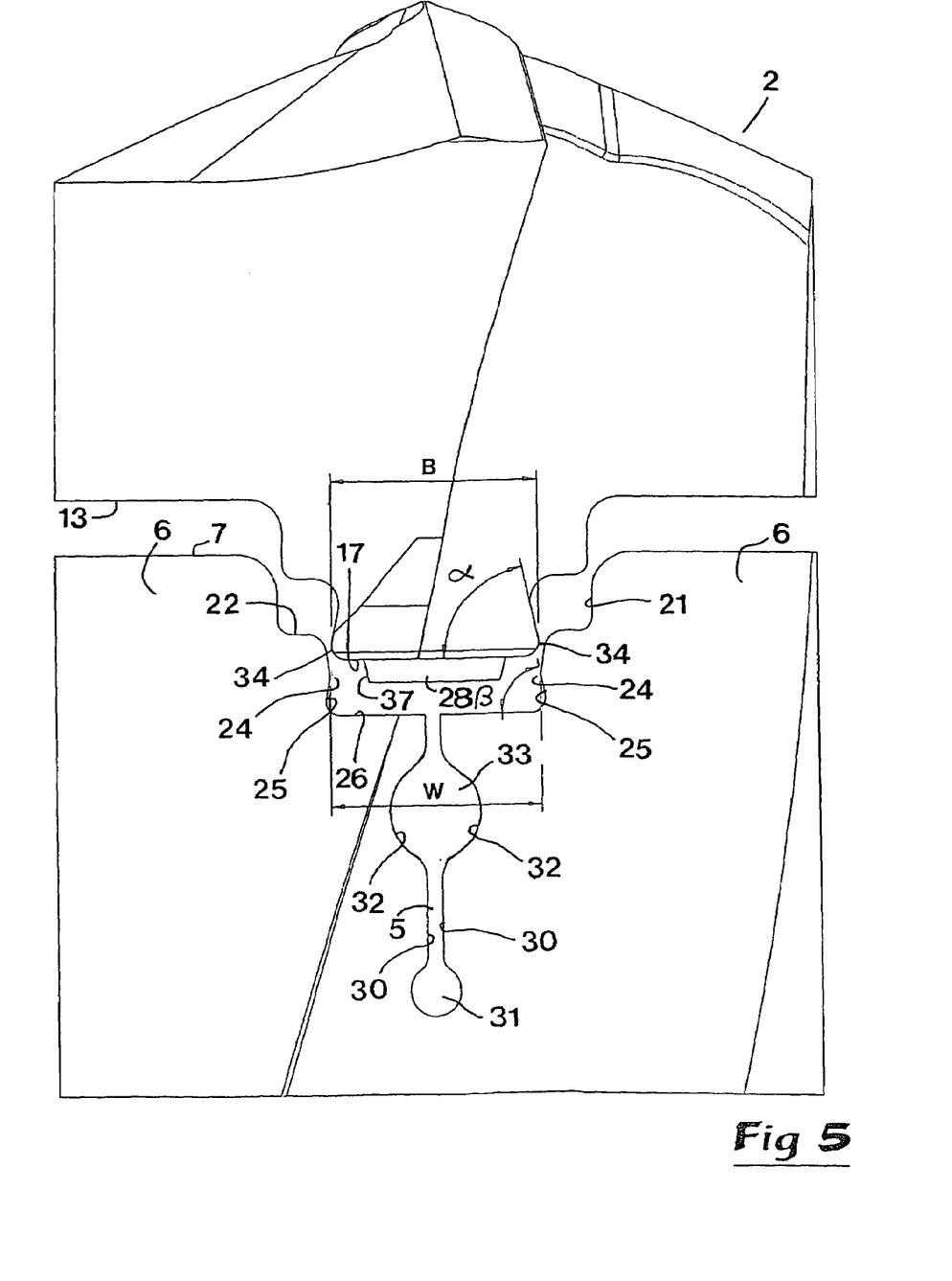
FIG. 5 is a side view of FIG. 4, which has been supplemented with extension arrows and angle arrows.
Figure 6:
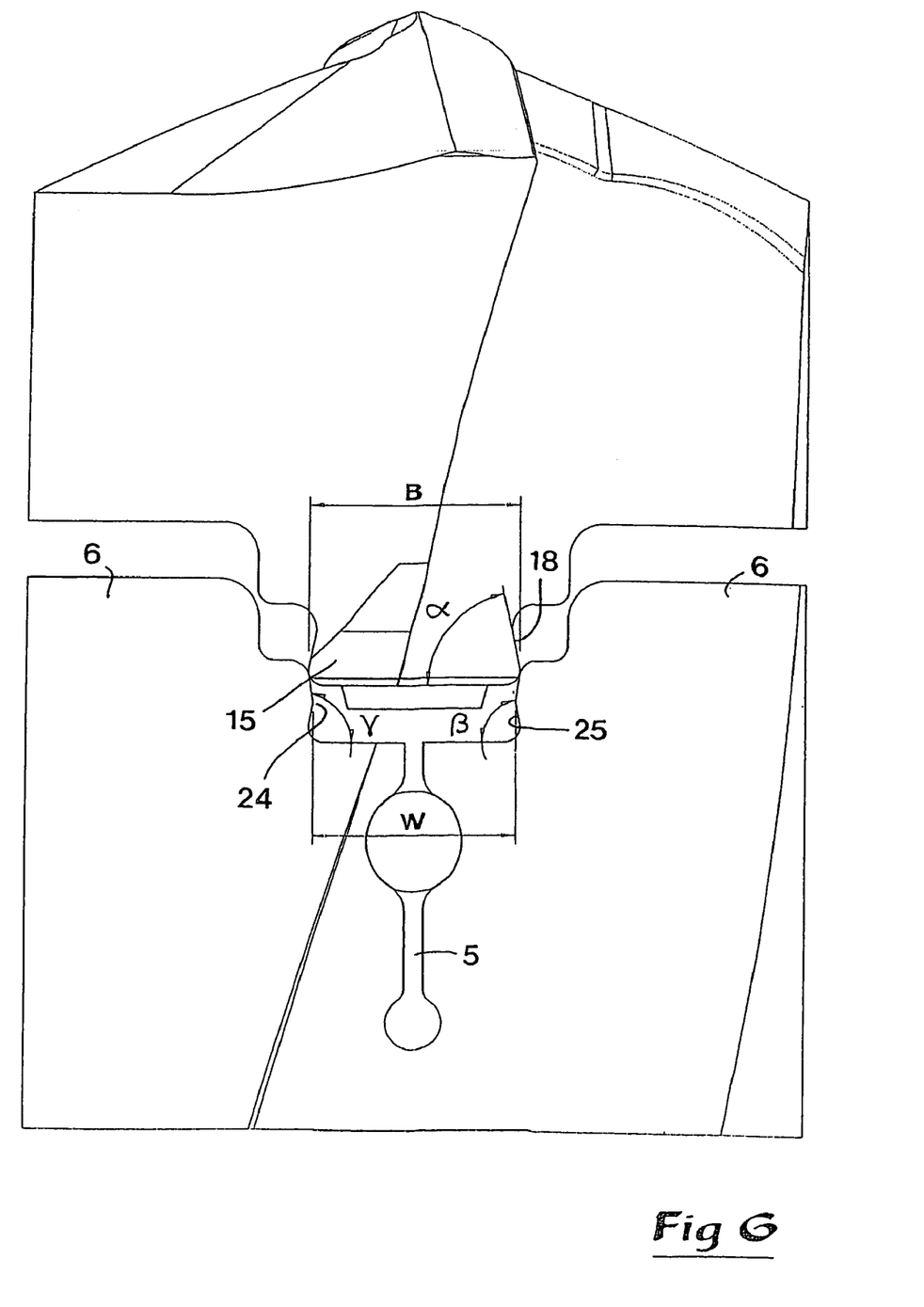
FIG. 6 is a side view similar to FIG. 5, showing the same basic body with the two legs in a tension-less originating state.

As is seen in FIGS. 4–6, the male part 12 is laterally elongate and has a partially tapering shape in the axial direction. In an analogous way, the groove 4 has a partially tapering shape in the axial direction. This axially tapering shape of the male part and the groove, respectively, means that the male part is drawn into the groove simultaneously as it is clamped by the legs 6 when the legs spring inwardly tightly against the male part. In the shown, preferred embodiment, the male part 12 includes a wedge-shaped or dovetail-shaped portion 15, as well as a thicker base portion 16 between the wedge portion 15 and the end surfaces 13. The wedge portion 15 is delimited by an axially facing rear end surface 17, as well as two flank surfaces 18 divergingly rearwardly from the surfaces 17, which are inclined at an acute angle α (see FIG. 5) relative to the end surface 17. These two flank surfaces 18 may advantageously be planar, although it is feasible, per se, to form the flank surfaces with a slightly curved, e.g., concavely curved shape. Also the end surface 17 may advantageously be planar.

The base portion 16 is delimited by, on one hand, two opposite flank surfaces 19, which are planar and mutually parallel, and on the other hand, two axially facing transverse surfaces 20 extending inward toward the flank surfaces 18, which transverse surfaces may be planar. Advantageously—though not necessarily—the flank surfaces 18, 19 of the male part 12 are symmetrical in relation to the center line C, i.e., the planar and parallel surfaces 19 on the base portion 16 are located at equally large radial distances from the center line. This is also the case with the flank surfaces 18 of the wedge portion 15, although these are inclined at an angle α (FIG. 5). The angle α should be within the range of 76–81° and preferably 78° (the complementary angle=12°).

The groove 4 has a cross-sectional shape that generally—but not exactly—corresponds to the cross-sectional shape of the male part 12. Thus, an outer space in the groove is defined by two side surfaces 21, which are planar and mutually parallel. Said surfaces 21 are intended to co-operate with the flank surfaces 19 on the base portion 16 of the male part. Inward from the two first side surfaces 21, a pair of axially facing transverse surfaces 22 extend, which transform into a pair of second side surfaces 23. These surfaces 23 transform in turn via edge lines or transitions 24 into a third pair of side surfaces 25, which transform into an axially facing planar bottom surface 26, more precisely via concavely curved transitions 27. These side surfaces 25 are inclined relative to the center axis and converge in the forward direction (i.e., toward the top 2), the surfaces 25 defining an inner space or bottom space in the groove. The acute angle between each side surface 25 and the planar bottom surface 26 is in FIG. 5 designated β and is equal to α.

The angle between each side surface 23 and the bottom surface 26 is in FIG. 6 designated γ. The angle γ is larger than the angle β. In other words, the side surfaces 23 are inclined in relation to the bottom surface 26 by an angle which is different than the angle by which the side surfaces 25 are inclined in relation to the bottom surface 26. Furthermore, these second side surfaces 23 are inclined in relation to the center axis C at an angle of (90−γ). This angle (90−γ) is smaller than the angle (90−β), which is formed between the side surface 25 and the center axis C.

According to one embodiment of the invention (not shown), the angle γ is chosen so that the side surfaces 23 are inclined to converge in the forward direction of the basic body.

According to another embodiment of the invention, the angle γ is chosen so that the side surfaces 23 are inclined and diverge in the forward direction of the basic body, i.e. the side surfaces 23 are inclined outward. In such an embodiment, the side surfaces 23 serve as guiding surfaces when inserting the male part 12 into the groove 4.

The side surfaces 23 may, according to yet another embodiment of the invention, be parallel to each other and, preferably, also to the center axis C.

Thanks to this arrangement of the angles β and γ, i.e. the angle γ being larger than the angle β, the insertion of the male part 12 into the groove 4 is enabled with a smaller deflection of the legs 6 than would otherwise be needed. Now reference is again made to FIGS. 1–3, which illustrate how the tool includes means for the centering of the loose top 2 in relation to the basic body 1. These means comprise a protrusion 28, which in the example is formed on the planar end surface 17 of the male part 12, as well as a seating 29, which is formed in the bottom surface of the groove 26. The protrusion 28 has a rotationally symmetrical basic shape, i.e., symmetrical about a center thereof, and is suitably—though not necessarily—placed on the middle of the end surface 17, i.e., halfway between the two opposite ends thereof. Like the protrusion 28, the seating 29 has a generally rotationally symmetrical basic shape.

As is shown in FIG. 5, the slot 5 is delimited by two planar surfaces 30, which in the tension-less (relaxed) state of the basic body are substantially parallel to each other. At the very rear back of the basic body, the slot 5 transforms into a through hole 31, which has a larger diameter than the width of the slot. At a certain distance rearwardly from the mouth of the slot in the bottom surface 26, the surfaces 30 transform into concavely curved part surfaces 32, which together define a through bore 33 having an oval cross-section shape. Into this bore 33, the aforementioned clamping key 14 may be inserted. Like the bore 33, the key 14 has a generally oval, e.g., elliptical, cross-section shape. This means that the key may be inserted without resistance into the bore when the major axes of the cross-sections coincide with each other, and then be rotated 90°. By the fact that the major axis of the key cross-section has been made somewhat larger than the minor axis of the bore cross-section, the two legs 6 will be successively deflected outward to maximally deflected positions in which the major axis of the key cross-section is perpendicular to the major axis of the bore cross-section.

In FIGS. 5 and 6, W designates the width of the openable jaw which is formed between opposite edge lines or transitions 24 between the side surfaces 23, 25. Furthermore, B designates the maximal breadth of the wedge portion 15, such as this is defined in a conceived radial plane that intersects the rear edge lines of the flank surfaces 18 or transitions toward the end surface 17. These transitions are in FIGS. 4 and 5 designated 34. Because the loose top 2 comprises a solid body, e.g., a cemented carbide body, the breadth B is invariable.

One of the characteristic features of the invention is that the jaw width W is on one hand, smaller than the breadth B when the basic body is tensionless, as is shown in FIG. 6, but larger than the breadth B when the legs 6 are deflected to a maximally deflected state (see FIG. 4). In such a way, the male part 12 may be inserted axially into the groove 4, something that was not possible in the tool according to EP 13 10 313-A1.

Another characteristic features is that the angles α and β are equally large. This means that surface contact is established between the flank surfaces 18 on the wedge portion 15 and the side surfaces 25, which delimit the bottom space in the groove.

The protrusion 28 has a truncated conical shape which becomes narrower as it gets farther from the surface 17. More precisely, the envelope surface of the protrusion should in a preferred embodiment be formed with a cone angle of about 20° (2×10°) However, smaller as well as larger cone angles are feasible, above all within the range of between 10° (2×5°) and 30° (2×15°). The protrusion is shallower than the seating 29, the rotationally symmetrical shape of which is determined by a cylindrical internal surface 35 (FIG. 4), which ends in a softly rounded edge or transition 36 adjacent to the bottom surface 26. The diameter of the seating is on one hand, somewhat larger than the smallest diameter of the protrusion in connection with the free end of the envelope surface 37 of the protrusion, and on the other hand smaller than the largest diameter of the protrusion in connection with the end surface 17. This design of the protrusion and the seating, respectively, means that the protrusion distinctly is centered in the seating by establishing, upon insertion in the seating, line contact with the edge surface 36 in a plane somewhere between the two opposite ends.

Below, an example follows of vital dimensions of a drill having a diameter of 16 mm (the diameter of the loose top that generates the hole in a workpiece). In this case, the wedge portion 15 has a largest breadth B of 4.0 mm. When the legs 6 assume the unaffected, tension-less state according to FIG. 5, the width W of the receiving jaw is 3.82 mm, i.e., 0.18 mm smaller than B. This means that the wedge portion of the male part 15 cannot freely be inserted into the bottom space of the groove. In order to enable insertion of the male part in the groove, the key 14 is inserted into the bore 33, as is shown in FIG. 6. Initially, the key cross-section has the major axis thereof in line with the major axis of the cross-section of the bore 33. When the key then is rotated 90° to the position shown in FIGS. 4 and 7, the legs 6 are deflected from each other, the width W being increased to 4.06 mm. In this state, the wedge portion 15 may be unresistingly (freely) inserted into the bottom space of the groove because the width of the receiving jaw is 0.06 mm larger than the largest breadth B of the wedge portion. Only by the simple measure of the user holding his/her fingers simultaneously pressed against the envelope surfaces of the basic body and of the loose top, the protrusion 28 will immediately be inserted into the seating 29. When the key 14 in a final step again is rotated 90° and returns to the position according to FIG. 6, and is removed from the bore 33, the legs 6 will, by the inherent elasticity thereof, spring back and be tightened against the male part. More precisely, the side surfaces 25 will be pressed against the flank surfaces 18 of the wedge portion 15, whereupon a force component directed axially rearward will be applied to the loose top in its entirety, which draws in the male part axially rearwardly to a fully retracted position in the groove, in which line contact is established between the envelope surface of the protrusion 28 and the outer limiting edge 26 of the seating 29. This engagement in the seating takes place without the end surface 17 of the male part contacting the bottom surface of the groove 26, as is clearly seen in FIG. 8. However, along the pairs of flank and side surfaces 18, 25, a genuine surface contact is established because the angles α and β are equally large. For a 16 mm drill, the contact surfaces 18, 25 may have a breadth, counted between outer and inner limit lines, of about 0.3 mm. Furthermore, surface contact is established between the flank surfaces 19 on the base portion 16 and the side surfaces 21 of the groove 4 located in front. This means that torque-transmitting surface contact between the male part and the legs is established in two axially spaced-apart areas along the longitudinal axis of the tool, namely on one hand, the area positioned closest to the main part of the loose top, which area is defined by the surfaces 19, 21, and on the other hand an area located farther rearward, which is defined by the contact surfaces 18, 25. By the fact that the last-mentioned surfaces 18, 25 have genuine surface contact with each other, contrary to the line contact according to EP 13 10 313, the tool according to the invention can transmit considerably greater torque between the basic body and the loose top, something which in turn considerably improves the possibilities of increasing the feed rate of the tool.

Figures 7, 8:
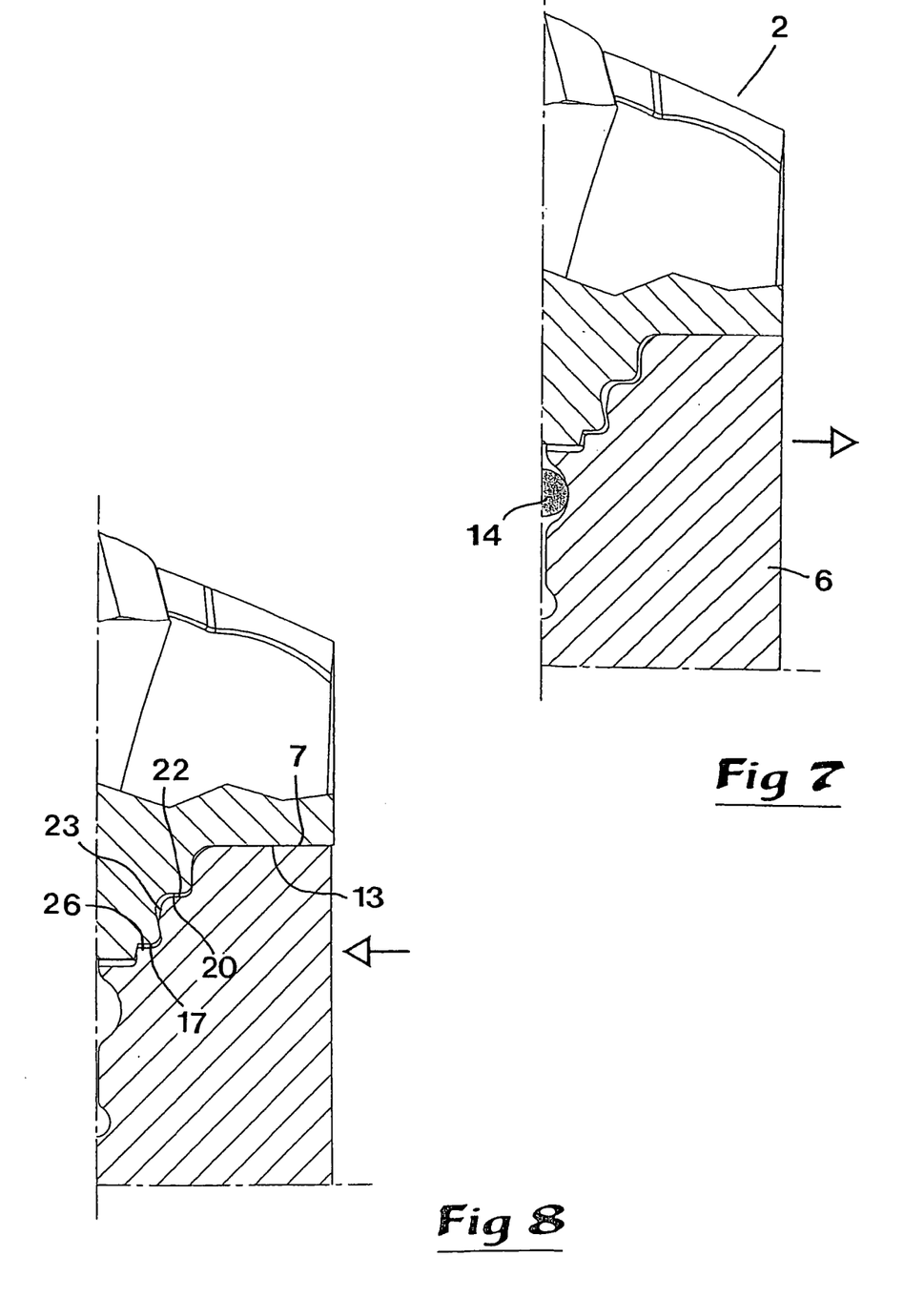
FIG. 7 is a partial longitudinal section through the tool with the loose top inserted into the groove of the basic body, arid with the legs of the basic body still deflected outward.
FIG. 8 is a section similar to FIG. 7 showing the loose top in a state clamped by the legs.

In connection with FIG. 8, it should also be noted that the transverse surfaces 20, 22 on the male part and in the groove, respectively, do not have contact with each other, when the loose top is clamped in the basic body. Nor do the surfaces 23 have contact with the outer portions of the flank surfaces 18. In other words, a cross-section-wise generally L-shaped clearance space is formed in this area.

In the clamped state, the jaw width W has been reduced from the maximal value of 4.06 mm thereof; however not to the initial measure of 3.82 mm. Thus, by suitable choice of the geometry of the construction, the width W is only reduced to 3.87 mm in the example in question. This means that the legs 6 continuously are kept pressed against the wedge portion of the male part by a certain prestress, more precisely by stress that results from the measure difference of 3.87−3.82=0.05 mm (2×0.025 mm) Although the prestress may be varied between strong (i.e., large measure difference) and moderate (i.e., limited measure difference), the same should in all events he chosen so that the loose top reliably is retained in the basic body in connection with the drilling tool being pulled out of a drill hole generated in a workpiece.

In the example according to FIGS. 1–8, the torque-transmitting surfaces 19, 21, which stand in contact with each other during operation, have a breadth of about 1 mm (counted between outer and inner limit lines).

ADVANTAGES OF THE INVENTION

In comparison to the tool according to EP 13 10 313, the tool according to the invention has a plurality of advantages. One advantage is that the new, unique coupling between the loose top and the basic body enables transmitting of great torque, whereby the feed rate of the tool may be substantially increased. Furthermore, the assembly and disassembly of the loose top is considerably simplified, above all by the fact that the male part of the loose top may be inserted axially into the groove rather than in the radial direction. In such a way, the engagement between the centering protrusion and the cooperating seating is largely facilitated. Furthermore, the protrusion can be formed with a considerably greater depth than the corresponding protrusion in the previously known tool. In such a way, a more distinct and reliable centering of the loose top is obtained. Another, valuable advantage is that the risk of demolition and scrapping of the loose top, e.g., as a consequence of crack formation and shear, respectively, is reduced to a minimum.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. Rotatable tool for chip removing machining, comprising a basic body rotatable about a geometrical center axis, and a replaceable cutting part which is rigidly connectable to an axially front end of the basic body by a male/female coupling; the coupling comprising a groove formed in a front end of the basic body, and a male part insertable into the groove and protruding axially rearwardly from the cutting part; the male part comprising a front base portion which is delimited by a pair of opposite, first flank surfaces, as well as a rear wedge portion which is narrower than the base portion and delimited by a pair of opposite, second flank surfaces; a forwardly open slot being formed in the front part of the basic body, which slot communicates with the groove and separates two elastically deflectable legs of the basic body which clamp the male part in the groove; the groove comprising two axially separated front and rear spaces; the front space mouthing at a free front end surface of the basic body and delimited by a pair of first, opposite side surfaces; the rear space being delimited by a second pair of opposite side surfaces; at least one of the two second flank surfaces of said male part being inclined at a first acute angle in relation to the center axis in a radially outward and axially rearward direction; one of the second side surfaces being disposed at the rear space of the groove and being inclined in relation to the center axis at a second acute angle in a direction radially inward and axially forward; the rear space of the groove forming a jaw having a variable minimum width in a radial plane oriented perpendicular to the center axis; the wedge portion of the male part having a maximum width in a radial plane; the legs being elastically deflectable away from one another, wherein the minimum width of the groove upon deflection of the legs away from one another being larger than the maximum width of the wedge portion of the male part; the first and second acute angles being equally large to create surface contact between the flank surfaces and the side surfaces when the legs resiliently spring back against the male part from their deflected state.

2. The tool according to claim 1 wherein the two flank surfaces of the wedge portion and the two side surfaces of the rear space are inclined at the same angle of inclination to the center axis.

3. The tool according to claim 2 wherein the angles of inclination are at least 76 degrees.

4. The tool according to claim 2 wherein said angles of inclination are at most 81 degrees.

5. The tool according to claim 1 further including a centering protrusion on a rear end surface of the wedge portion of the cutting part, the protrusion having a truncated conical shape and a smallest diameter and a largest diameter; the smallest diameter being smaller than the diameter of a front limiting edge of a rotationally symmetrical seating formed in a bottom surface of the groove; the largest diameter being larger than the diameter of the front limiting edge.

6. The tool according to claim 1 wherein said inclined side surface transforms via an edge line into a second side surface.

7. The tool according to claim 6 wherein two inclined side surfaces transform via a respective edge line into a respective second side surface.

8. The tool according to claim 6 wherein the second side surface is inclined in relation to the center axis at a third acute angle which is smaller than said second angle.

9. The tool according to claim 8 wherein said second side surface is inclined in a direction radially outwardly and axially forwardly.

* * * * *